United States Patent
Aminzadeh

(10) Patent No.: US 7,756,531 B2
(45) Date of Patent: Jul. 13, 2010

(54) METHOD AND APPARATUS FOR AVOIDING CALL DISTURBANCES AND FACILITATING URGENT CALLS BASED ON A CALLER'S DECISION

(76) Inventor: Farhad John Aminzadeh, 3501 26th Pl. West, Apt. 523, Seattle, WA (US) 98199

( * ) Notice: Subject to any disclaimer, the term of this patent is extended or adjusted under 35 U.S.C. 154(b) by 1185 days.

(21) Appl. No.: 10/653,718

(22) Filed: Sep. 2, 2003

(65) Prior Publication Data

US 2007/0275697 A1  Nov. 29, 2007

Related U.S. Application Data

(60) Provisional application No. 60/408,271, filed on Sep. 4, 2002.

(51) Int. Cl.
*H04W 24/00* (2009.01)
*H04M 3/42* (2006.01)
*H04M 3/00* (2006.01)

(52) U.S. Cl. .............. 455/456.4; 455/456.1; 455/456.2; 455/456.3; 455/414.1; 455/418

(58) Field of Classification Search .............. 455/456.1, 455/456.2, 456.3, 456.4, 456.5, 456.6, 414.1, 455/418, 445, 433
See application file for complete search history.

(56) References Cited

U.S. PATENT DOCUMENTS

| 5,479,476 A * | 12/1995 | Finke-Anlauff ............. 455/566 |
| 6,160,995 A * | 12/2000 | Kiswani et al. .......... 379/88.12 |
| 7,069,018 B1 * | 6/2006 | Granstam et al. ........ 455/456.1 |
| 2002/0168987 A1 * | 11/2002 | Wang et al. ................. 455/456 |
| 2002/0173317 A1 * | 11/2002 | Nykanen et al. ............ 455/456 |

* cited by examiner

*Primary Examiner*—Nick Corsaro
*Assistant Examiner*—Shannon R Brooks
(74) *Attorney, Agent, or Firm*—Christie, Parker & Hale, LLP

(57) ABSTRACT

A telecommunication system and method for notifying a calling party, via a Preventive Disturbance Announcement (PDA), that a called party is in an area where the called party would prefer not to be disturbed with non-urgent calls. The calling party is then given the opportunity to either talk to the mobile called party or to leave a message or callback number. If the calling party decides to try to talk to the user, a Home Location Register (HLR) directs the call to a Visitor Location Register (VLR), and a mobile ending call is generated via a Mobile Switching Center (MSC). For non-urgent calls, the called party is given an option to refuse a voice mail page or Caller ID page of the non-urgent calls. The HLR will direct the Short Message Service (SMS) Service Center (SMS/SC) to store, in a buffer or external source, the Caller ID of non-urgent calls that were not connected to the called party while the PDA was active.

36 Claims, 9 Drawing Sheets

Fig 4:
Silence Desired Request (SDR) components
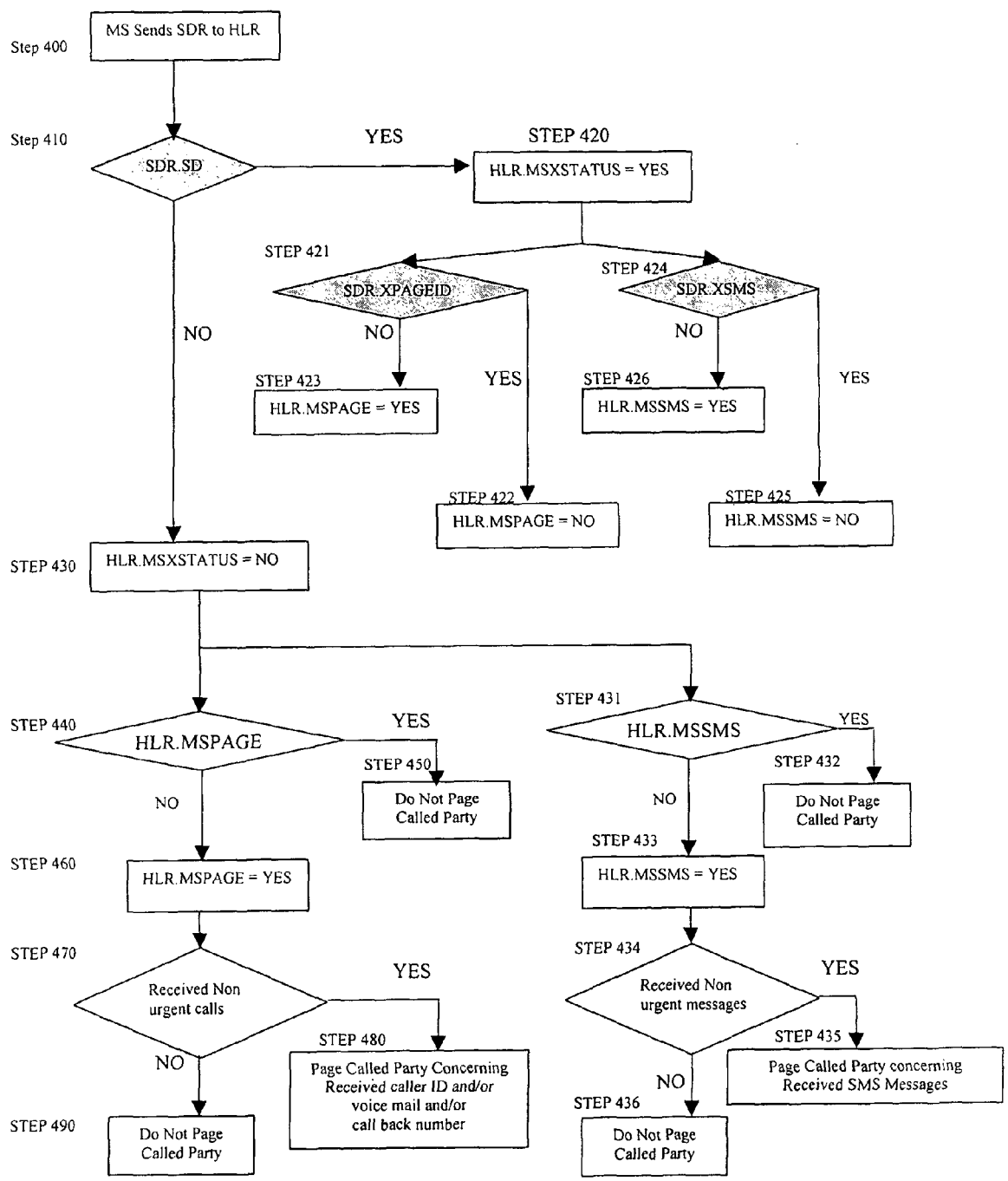

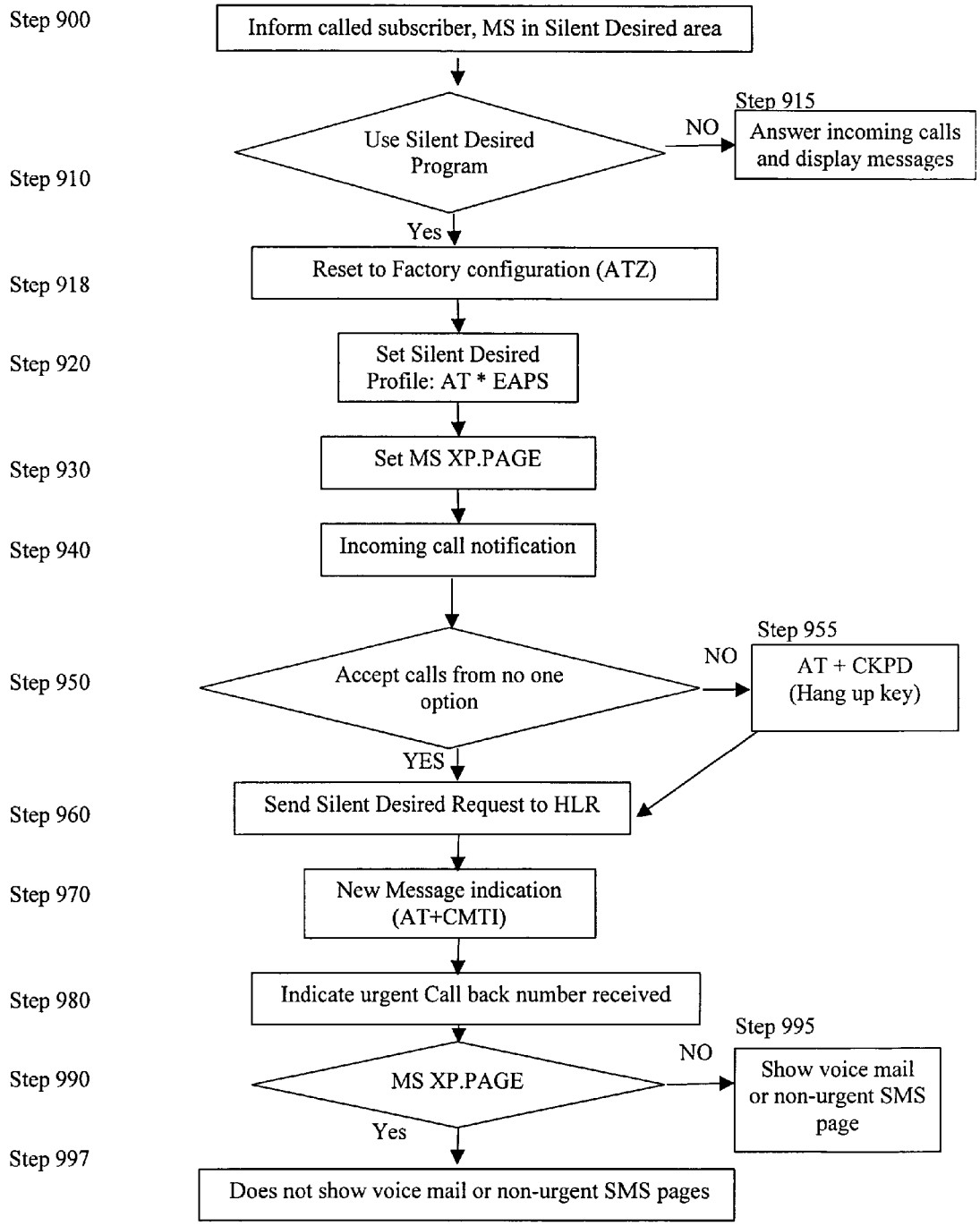

METHOD AND APPARATUS FOR AVOIDING CALL DISTURBANCES AND FACILITATING URGENT CALLS BASED ON A CALLER'S DECISION

REFERENCE TO PROVISIONAL APPLICATION

This application claims the benefit of the U.S. Provisional Application No. 60/408,271, filed Sep. 4, 2002.

TECHNICAL FIELD

The present invention relates to a telecommunication system, methods and apparatus for called party's features, and more specifically of providing a non-disturbance environment for a called party within a cellular network.

BACKGROUND OF THE INVENTION

In many areas, the use of mobile terminals of wireless telecommunication systems by one person is regarded as a disturbance to other people. Such environments include libraries, restaurants and work environments. In other situations, use of mobile terminals may be dangerous, for example, by interfering with an individual's safe operation of an automobile.

Different solutions have been proposed to avoid disturbance by a mobile terminal. Examples are 1) call rejection based on Caller ID (U.S. Pat. No. 6,253,075 to Beghtol), 2) Delayed Call Answering (U.S. Pat. No. 6,246,889 to Boltz), and 3) alerting the portable communication device of an incoming call by an external device (U.S. Pat. No. 6,119,022 to Osborn).

Disturbance problems have partly been resolved by the above solutions. However, under these solutions, some emergency calls may be rejected if call rejection is used on a number believed to be unimportant by the called party. On the other hand, if delayed call answering (Boltz et al) or an external incoming call alert (Osborn et al) are utilized, non-urgent phone calls have the possibility of disturbing the mobile called party.

Further approaches have been taken by network innovations to alert the user to turn off their mobile terminal if the user is in an area where silence is desired (U.S. Pat. No. 6,085,096 to Nakamura et al). It is also possible to turn off or silence a mobile terminal by changing the mobile terminal operation mode utilizing the base station that the mobile terminal resides in (U.S. Pat. No. 6,342,212 to Weber et al, U.S. Pat. No. 5,996,655).

The network solutions of turning off the mobile terminal do not allow for emergency calls to reach the called party. On the other hand, if mobile terminal devices' ring tones were turned into silence or vibration (US Patent No. 2001/0031631 A1 to Pitts et al), the called party would be able to receive urgent calls but would also be disturbed by non-urgent calls. For instance, the proposal of Pitts et al. to send several standard messages to the calling party (such as "The party you are calling is in a secure area, please call back later." or "The party you are calling is in a secure area." or "The party you are calling can listen only.") would still lead to distraction of the called party if the call were non-urgent.

Innovative solutions have been used to locate a mobile communication device and to alert a mobile party that he or she is being positioned (U.S. Pat. No. 6,311,069 to Havinis et al). The use of GPS information and a database to provide silence-desired areas have been proposed by Anderson et al (U.S. Pat. No. 6,230,017), Valentine et al (U.S. Pat. No. 6,011, 973) and Alperovich et al (U.S. Pat. No. 6,233,448). Anderson et al propose hard and soft cells where communication with a mobile station can take place. If an urgent call is placed to a mobile station in a hard cell, the call will not go through. Valentine et al propose that transmission is restricted in certain cells but reception is enabled. Alperovich et al propose automatic feature activation (such as call forwarding) based on positioning, i.e., GPS. In all the systems using GPS described thus far, either 1) the mobile phone is shut off, silenced or forwarded, and the called party consequently misses urgent calls or 2) the call is placed and the called party may be disturbed by non-urgent calls.

Innovative solutions have been used to avoid distraction of the called party by Short Message Service (SMS) messages in a cellular telephone network described by Alperovich et al (U.S. Pat. No. 6,101,393). A screening application resident on a Home Location Register (the HLR) determines the identity of the entity associated with any request for short message routing information and causes the short message to be delivered or deleted according to the input provided by the called party. Essentially, a version of call rejection based on Caller ID for SMS messages is based on the identity of the entity associated with the request. Some urgent messages may be deleted or rejected based on the identity of the short message sender but other messages may still disturb the called party, who has to respond to non-urgent SMS messages.

It is an object of the present invention to provide a means for a called party to inform the calling party that the called party is in a "do not disturb" environment. It is a further object of the present invention to provide means for a calling party to make a decision to forward a call or SMS message to the called party, based on urgency and importance of the call.

While a mobile phone subscriber can be contacted at virtually any given time, there are conditions where a mobile phone subscriber may not want to be disturbed. The mobile phone alerting the called party might cause distraction and safety issues such as 1) while the called party is driving, and 2) when the called party is in an area where the called party is not allowed to receive a call (such as in a library or theatre). A first distraction occurs when a mobile phone alerts the called party of an incoming call. The distraction is further aggravated when the called party answers the call. Even if the called party originally decides not to answer the call, the called party may later be persuaded to find out the nature of the call once Caller ID is displayed or a voice mail notification page is received.

However, if the called party decides to answer the call, it might lead to further distraction of the called party. "Scientists at the University of Utah found that carrying out a telephone conversation while driving resulted in motorists driving less carefully than normal. The research found that using a mobile phone was more distracting than listening to music or a book on tape. This was the case even if the driver was using a hand-free mobile set—suggesting that the distraction is caused by a driver having to concentrate on the phone conversation" (ZD Net UK, "Safety fears over mobile use by car drivers", Graeme Wearden, Friday 17 Aug. 2001).

Presently, to avoid receiving a call, a called party could utilize Caller ID capability, which would allow the called party to decide whether or not to answer a call. The called party might utilize call rejection function, which, based on a Caller ID number, would decide to reject communicating with the calling party. To achieve silence, the called party can turn off the phone, put it on vibration mode, on silence mode, or forward calls to its voice mail, answering machine or another phone number. The called party can further achieve silence by putting a calling party on hold until time is appropriate to answer the call.

There are problems with the current Global System for Mobile Communication (GSM) network and messaging in providing silence to the called party. For example, current applications leave the decision of whether to disturb the called party totally in hands of the called party. Regardless of whether a call or message is urgent or not, the calling party is going to disturb the called party.

Presently, utilizing all the above-mentioned options provided by the GSM network, a called party cannot intelligently distinguish urgent calls from non-urgent calls. This increases the distraction risk while the called party is driving an automobile, causes a disturbance if the called party is in a meeting, and disturbs others if the called party is in a silence-desired area, such as a library or restaurant. If the called party decides to ignore the urgent incoming call, the call will be forwarded to a voice mail system or be abandoned by the calling party. This could be undesirable, as the calling party might have placed an emergency or other important call to the called party. If the calling party decides to leave a message for the called party, the called party might be further disturbed by a message page notification directed by the HLR. Additionally, the curiosity of who left the message or what the message contains might further distract the called party. Finally, the called party may try to retrieve the voice mail or non-urgent call left by the calling party, furthering the disturbance.

Currently, the called party could utilize the GSM network the HLR base Caller ID capability, which would allow the called party to decide to reject an SMS text based message i.e.: not Caller ID page, not voice mail-received page and not callback number page. Also, to achieve silence, the called party can turn off the phone or put it on vibration. The called party can further achieve silence by directing the mobile station (MS) to put received SMS text based message i.e.: not Caller ID page, not voice mail-received page and not callback number page messages in its memory to read later on. Utilizing the above-mentioned options provided by the GSM network, a called party couldn't distinguish urgent SMS messages from the non-urgent messages, thus increasing the distraction risk for non-urgent messages.

It is therefore an object of the current invention to provide a way for a called party to let a calling party know that the called party is in an area where silence is desired. The present invention would also provide the means for the calling party to forward the call or message to the called party at the discretion of the calling party, based on the urgency or importance of a call or message. The present invention further provides the means to store the Caller ID pages, voice mail pages and other SMS messages of non-urgent calls in a database at a SMS Service Center (SMS/SC), an external buffer or other storage site. The SMS/SC is then directed by the HLR to transmit the stored SMS messages to the called party once the called party is out of any silence-desired area.

It is important to note that, although the present invention provides the means by which the calling party can request the GSM network to put an urgent call or message through to the called party, there are still options left in the hands of the called party. These include the options to answer or not to answer, to read or not to read an SMS message, to put on hold or forward a call or message, to reject a call or message or to forward a message to voice mail. In essence, what the calling party may find urgent may not be found urgent by the called party, and the called party deals with the call appropriately with minimal disturbance.

SUMMARY OF THE INVENTION

According to a first aspect, the invention is an apparatus for controlling access to at least one subscriber in a communication system, the subscriber being in either an access-denied state or an access-allowed state. The apparatus includes a receipt circuit to receive a message directed to the subscriber and a state evaluation circuit to determine whether the subscriber is in the access-denied state or the access-allowed state. The apparatus further includes a message handling circuit to store or forward the received message to the subscriber, depending upon whether the subscriber is in the access-denied or the access-allowed state.

According to a second aspect, the invention is a method for controlling access to at least one subscriber in a communication system, the subscriber being in either an access-denied state or an access-allowed state. The method includes the steps of a) receiving a message directed to the subscriber and b) determining whether the subscriber is in the access-denied state or the access-allowed state. The method also includes the step of c) storing or forwarding the received message to the subscriber, depending upon whether the subscriber is in the access-denied or the access-allowed state.

According to a third aspect, the invention is an apparatus for controlling access to at least one subscriber in a communication system, the subscriber being in either an access-denied state or an access-allowed state. The apparatus includes means for receiving a message directed to the subscriber, and means for determining whether the subscriber is in the access-denied state or the access-allowed state. The apparatus also includes means for storing, or forwarding the received message to the subscriber, depending upon whether the subscriber is in the access-denied or the access-allowed state.

According to a fourth aspect, the invention is an apparatus for signaling a network being used by a mobile system in a communication system, the mobile system being in either an access-denied state or an access-allowed state. The apparatus includes a first circuit to cause the mobile system or part of the network to send a message directed to the network and a receipt circuit to receive the message directed to the network. The apparatus also includes a state evaluation circuit to determine whether the mobile system is in the access-denied or the access-allowed state and a message handling circuit to store the message directed to the network or forward the message to the network, depending upon whether the mobile system is in the access-denied state or the access-allowed state.

According to a fifth aspect, the invention is a method for signaling a network being used by a mobile system in a communication system, the mobile system being in either an access-denied state or an access-allowed state. The method includes the steps of a) causing the mobile system or part of the network to send a message directed to the network and b) receiving the message directed to the network. The method also includes the steps of c) determining whether the mobile system is in the access-denied or the access-allowed state; and d) storing the message directed to the network or forwarding the message to the network, depending upon whether the mobile system is in the access-denied state or the access-allowed state.

According to a sixth aspect, the invention is an apparatus for signaling a network being used by a mobile system in a communication system, the mobile system being in either an access-denied state or an access-allowed state. The apparatus includes means for causing the mobile system or part of the network to send a message directed to the network and means for receiving the message directed to the network. The apparatus also includes means for determining whether the mobile system is in the access-denied or the access-allowed state, and means for storing the message directed to the network or forwarding the message to the network, depending upon whether the mobile system is in the access-denied state or the access-allowed state.

BRIEF DESCRIPTION OF THE DRAWINGS

FIG. 4 is a flow chart of the operation of a portion of the inventive mobile communication system.

FIG. 9 is a flow chart of the steps performed by the MS when used in a working prototype for the patent application.

DETAILED DESCRIPTION OF THE PREFERRED EMBODIMENTS OF THE INVENTION

The numerous innovative teachings of the present application are described with particular reference to the presently preferred exemplary embodiments. However, it is understood that these embodiments provide only a few examples of the many advantageous uses of the innovative teachings herein. It should be understood that statements made in the specifications of the present application do not necessarily delimit any of the various claimed inventions. Moreover, some statements may apply to some inventive features but not others.

The present invention relates generally to the problem of providing information about a called party's status in a mobile communication system. It more particularly alerts the calling party that the called party is in an area where silence is desired, for example, in a car, library or theatre. The calling party then is given an option to notify the called party of the incoming call or SMS message if the call or SMS message is urgent. The calling party is given a further option to leave a callback number or a message for the called party. Once the called party is out of all silence-desired areas, the called party is notified of any messages or callback number(s) or of means for reaching the calling party. The present invention further describes a silencing system and method for creating silence-desired areas for the called party.

Figure 1:
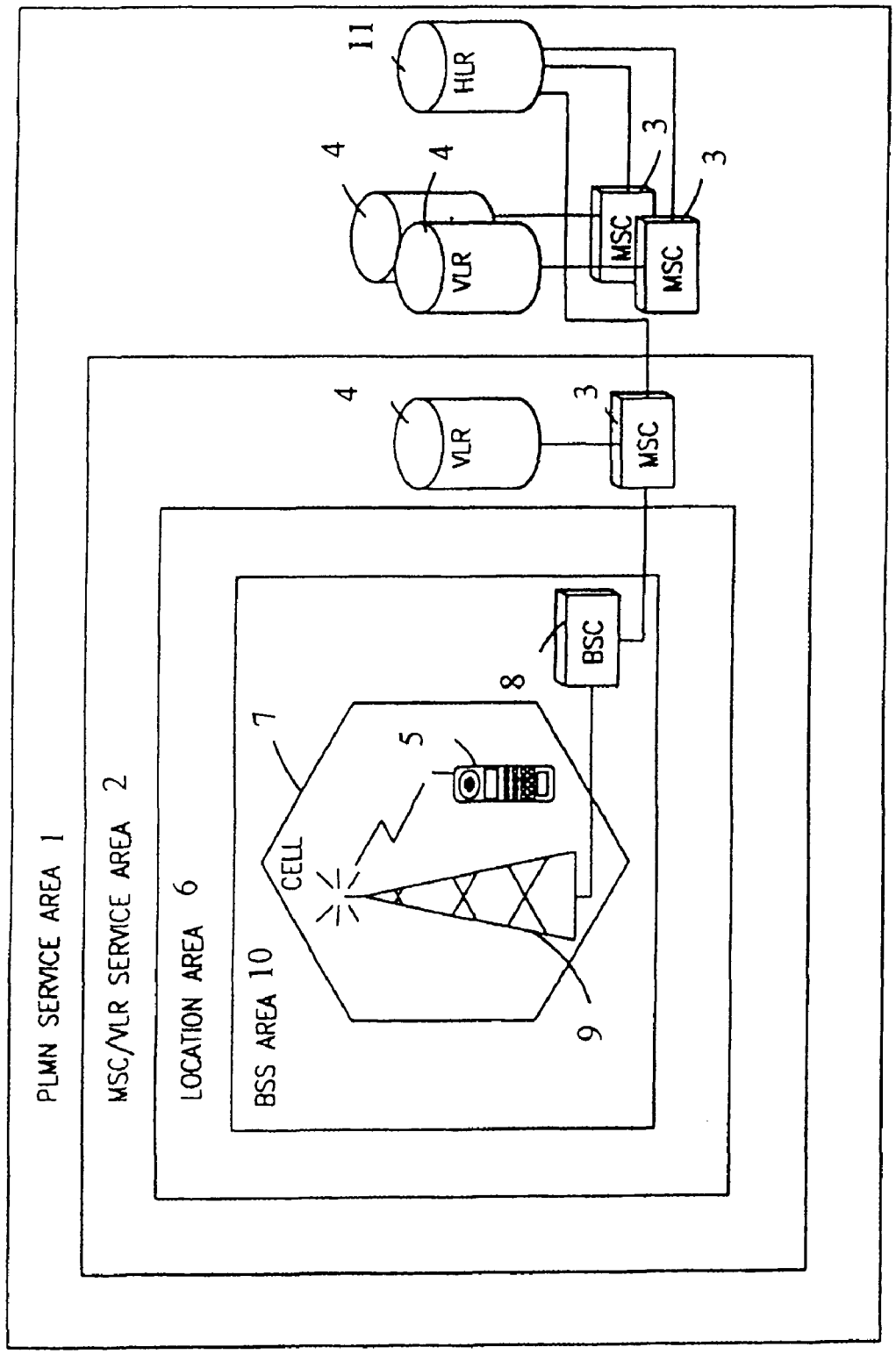
FIG. 1 is a block diagram of a mobile communication system.

FIG. 1 is a block diagram of a mobile communication system, such as GSM (Global System for Mobile Communication), AMPS, or PDC. The discussion here will emphasize a system that corresponds to GSM. However, it can be appreciated by a person skilled in the art that there are many similarities between mobile systems such as GSM and CDMA and many of the problems in one system also exist in others.

FIG. 1 illustrates a public land mobile network (PLMN), such as cellular network 1, which in turn is composed of plurality of areas 2, each with a mobile switching center (MSC) 3 and an integrated visitor location register (VLR) 4 therein. The MSC 3 provides a circuit switched connection of speech and signaling information between a mobile station (MS) 5 and the PLMN 1. The MSC/VLR areas 2, in turn, include a plurality of location areas (LA) 6, which are defined as that part of a given MSC/VLR area 2 in which the MS 5 may move freely without having to send update location information to the MSC 3 that controls the LA 6. Each LA 6 is divided into a number of cells 7. The MS 5 is the physical equipment, e.g., a car phone or other portable devices used by a PLMN, each other, and users outside the subscribed network, both wire line and wireless.

The MSC 3 is in communication with at least one base station controller (BSC) 8, which in turn is in contact with at least one base transceiver (BTS) 9. The BTS 9, illustrated as a tower, provides radio coverage to the cell 7 for which it is responsible. The BSC 8 may be connected to several BTS 9, and may be implemented as a stand-alone node or integrated with the MSC 3. In either event, the BSC 8 and BTS 9 components, as a whole, are generally referred to as a base station system (BSS) 10.

With further reference to FIG. 1, the PLMN service area or cellular network 1 includes a Home Location Register (HLR) 11. The HLR is a database maintaining all subscriber information, e.g., user profiles, current location information, International Mobile Subscriber Identity (IMSI) numbers, and other administrative information for the subscriber registered with the PLMN 1. The HLR 11 may be co-located with a given MSC 3, integrated with the MSC 3, or, alternatively, can service multiple MSCs 3, the latter of which is illustrated in FIG. 1.

When the MSC 3 receives a call terminating at the MS 5, the MSC 3 directs the BSS 10 to transmit, via the BTS 9, a signal alerting the MS 5.

Figure 2:
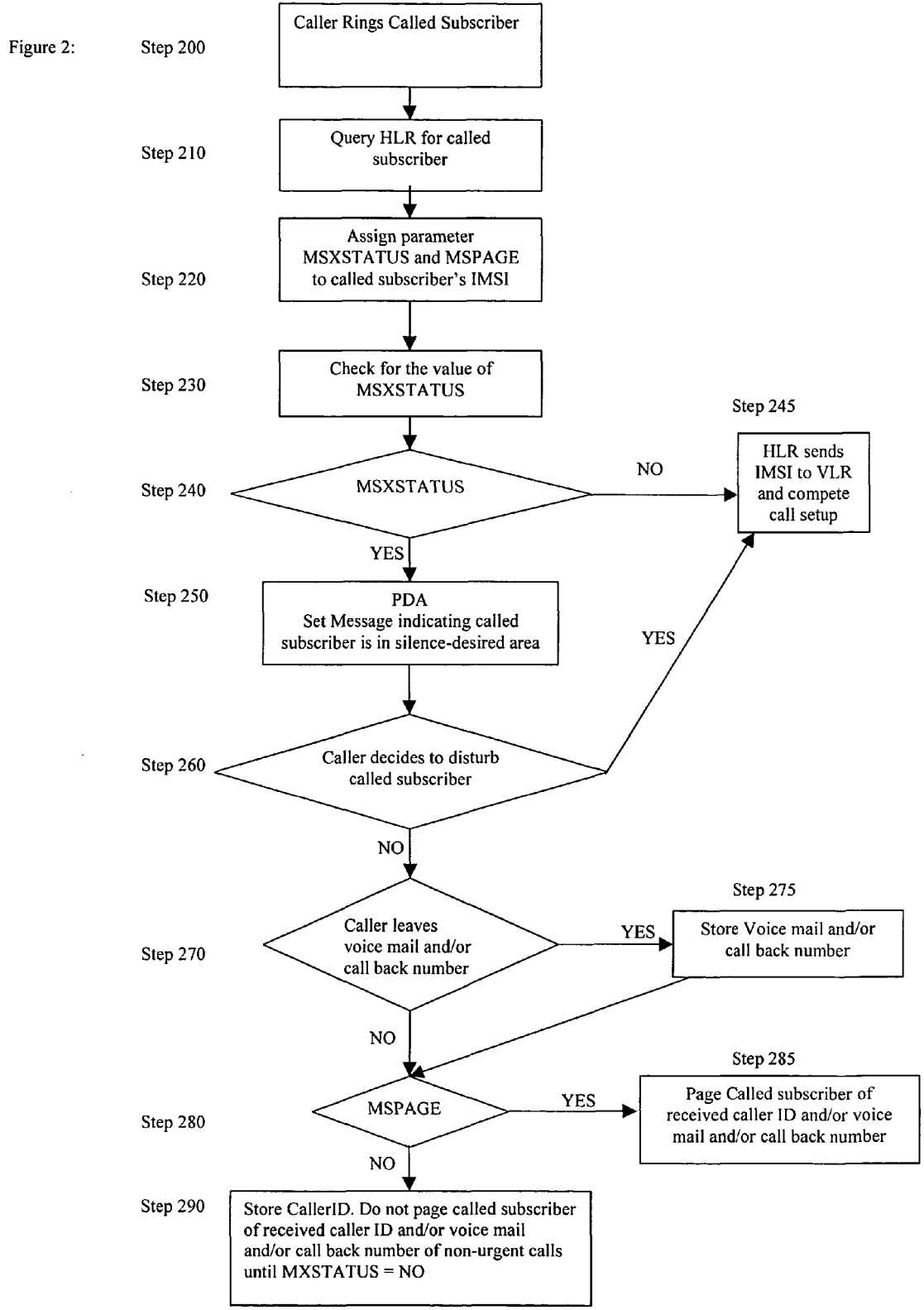
FIG. 2 is a flow chart of the operation of a mobile communication system in accordance with the present invention.

FIG. 2 is a flow chart of the operation of a mobile communication system in accordance with the present invention. First, the calling party tries to call the called party, where the called party is a subscriber to the PLMN (step 200). After all the necessary steps of routing are completed, the HLR serving the PLMN in which called party resides is queried about the called party's location (step 210). The HLR then translates the called party's number into an IMSI.

The above procedures described in FIGS. 1 and 2 are currently part of the operation of PLMN systems (such as GSM). However, the next step is different from the current GSM network. This step is to assign three parameters MSXSTATUS, MSPAGE and MSSMS to called party's IMSI (step 220) in the HLR for the PLMN where the called party is located. The first parameter, Mobile Station Silence Status (MSXSTATUS, X meaning silence), can take one or two possible values: NO and YES. The second parameter, Mobile Station Page (MSPAGE), represents receiving SMS-based messages: Caller ID page and/or voice mail-received page and/or callback number of non-urgent calls. The MSPAGE could have values of either YES or NO. The third parameter, Mobile Station SMS (MSSMS), represents receiving other SMS-based messages, i.e., not Caller ID page and/or voice mail received page and/or callback number of non-urgent calls. The MSSMS could have values of either YES or NO.

Once the HLR receives a call, it checks the value of MSXSTATUS and MSPAGE for the called party's IMSI. By default, MSXSTATUS is set to NO and MSPAGE is set to YES. If MSXSTATUS=NO (step 240, FIG. 2), this means that the called party does not desire silence or is not in a silence preferred area. Therefore, the MS for the called party is turned ON and the called party is listening for a page to receive a call. The HLR then sends the IMSI to the VLR (step 245, FIG. 2) and completes the call setup. In the case where MSXSTATUS=YES (step 240, FIG. 2), subsequent calls to the called party will result in a Preventive Disturbance Announcement (PDA) (step 250), (for example, "The subscriber you have called is in an area where it prefers not to be disturbed"). Furthermore, the invention would leave the choice of whether to disturb the called party in the hands of the calling party by providing an option to connect to the called party if the call is important or an emergency (step 260). The connection option message could be, for example, "If this call is important or an emergency, press 1 or say 'emergency', otherwise stay on the line to leave a message or callback number". Of course, any other numbers, pound, asterisk (*), combination of numbers, combination of numbers and non number keys, and other voice options such as "Connect" could be used to connect the calling party's call to the called party.

If the calling party decides to disturb the called party by choosing the disturb option from the connection option message, for example, by pressing 1 or saying "emergency", the HLR will then send the IMSI to the VLR (step 245) and the call setup will continue as already defined in GSM networks. Alternatively, the called party can forward emergency and other important calls to a landline, which the called party has chosen previously. If the calling party decides the call is not important or an emergency, then the calling party would leave a stored message or callback number (step 275) or hang up the phone.

To avoid distracting the called party, the called party would not be paged by the HLR by voice mail(s) received page, Caller ID page, callback number page or any other notification pages of non-urgent calls. This is done by the HLR setting MSPAGE=NO, as a default value when MSXSTATUS=YES (step 220, FIG. 2). If the calling party decides the call is not urgent (step 260), by default, since MSPAGE=NO (step 280), the called party would not be paged for received Caller ID and/or voice mail and/or callback number (step 290). Furthermore, the HLR would direct the SMS Service Center (SMS/SC) to store the Caller ID of non-urgent calls and/or voice mail-received page and/or callback number page of non-urgent calls (290, FIG. 2). However, the called party in another part of the current invention could be given an option to receive a page notification of voice mail received, Caller ID or callback number of the non-important calls while in a silence-desired area by having MSPAGE=YES (step 285).

Figure 6:
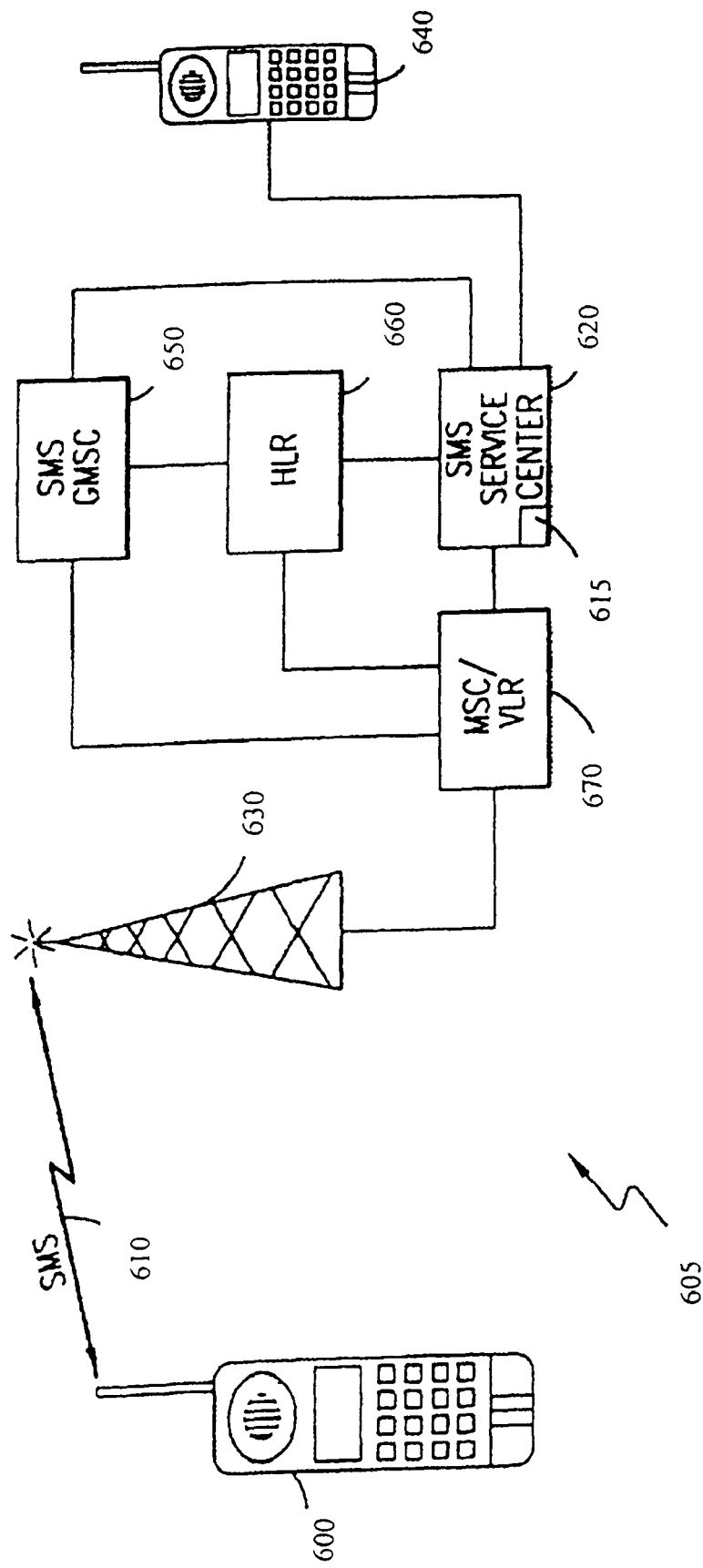
FIG. 6 illustrates the delivery of Short Message Service (SMS) messages to and from a mobile terminal.

Referring to FIG. 6 of the drawings, text messages, containing up to 160 alphanumerical characters, can be sent to and from MS 600, using the Short Message Service (SMS) 610. The SMS 610 utilizes a Service Center 620, which stores and forwards short messages to MS 600. A message from the SMS 610 can be sent from the Service Center 620 to the MS 600 or from the MS 600 to the Service Center 620.

The mobile terminated SMS 610 transfers a short message from the Service Center 620 to the MS 600. In addition, information about the delivery of the short message is returned to the Service Center 620. This information is either a delivery report, which confirms the delivery of the message to a recipient, or a failure report, which informs the calling party that the short message was not delivered and the reason why. If the information is a failure report, the calling party has the ability to order transmission later.

A mobile terminated SMS message typically originates when user 640 sends a message to the Service Center 620, which then forwards the message to the SMS Gateway Mobile Switching Center (SMS-GMSC) 650. Thereafter, the SMS-GMSC 650 interrogates the HLR 660 for routing information pertaining to the designated MS 600. The HLR 660 returns this routing information to the SMS-GMSC 650, which can then route the message to the MSC/VLR 670 serving the Location Area (LA) (6 in FIG. 1) where the MS 600 is located. If the MS 600 is in IDLE mode (not in use), the MS 600 is located, and a connection is set up between the MS 600 and the network 670, as in a normal call setup case. The MSC/VLR 670 then delivers the SMS message 610 to the MS 600. SMS messages 610 are preferably transmitted on the allocated signal channel. However, if the MS 200 is in busy mode (in use), the SMS message 210 will be transmitted to a Slow Associated Control Channel (SACCH). In that case, no paging, call setup, or authentication needs to be performed.

Figure 7:
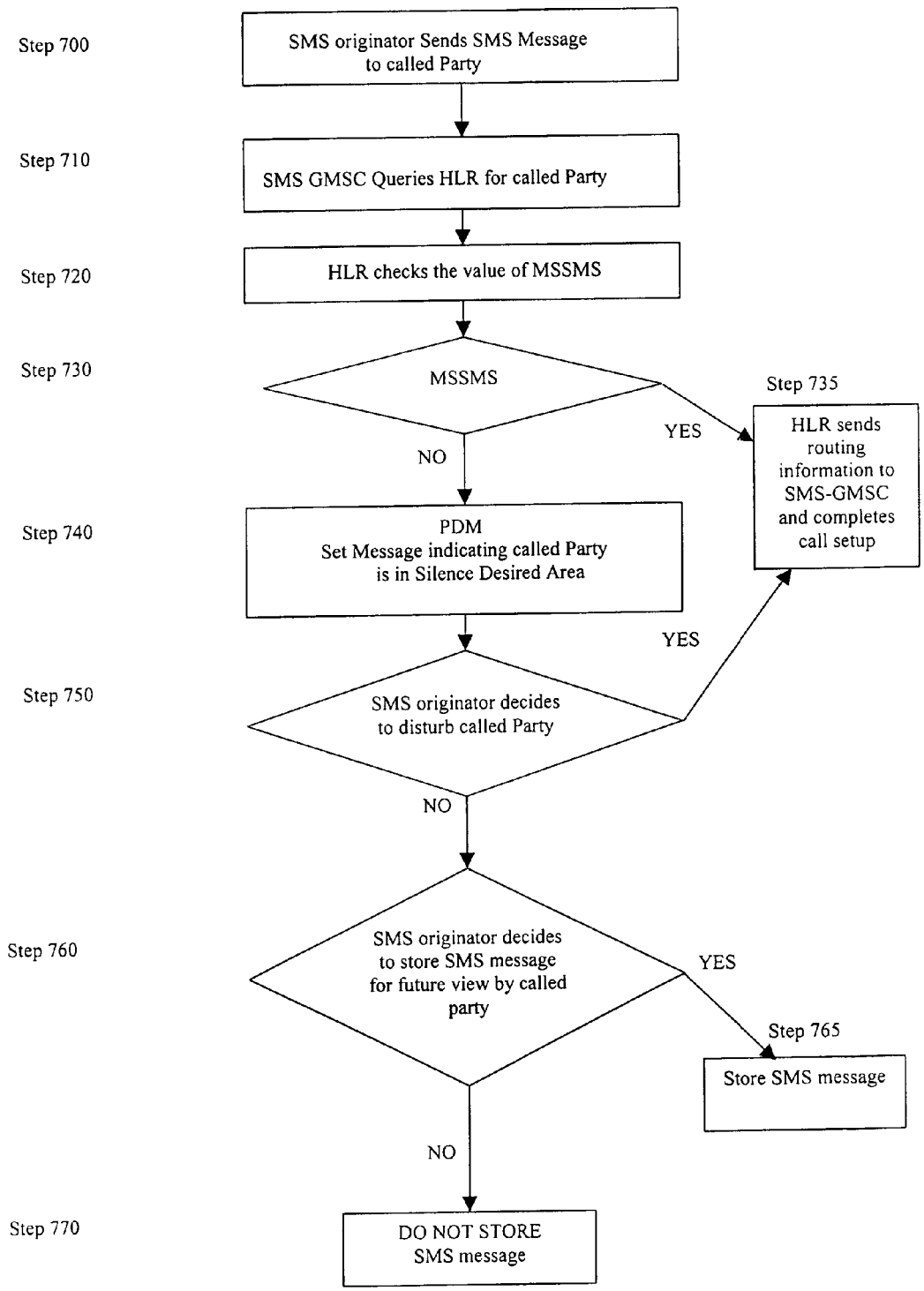
FIG. 7 is a flow chart of the operation of a second embodiment of the present invention.

To avoid the distraction of the called party, for example, while driving, the called party would not be paged by the HLR for non-urgent SMS message(s) (for example, text-based short message(s) of non-urgent nature). FIG. 7 is a flow chart of the operation of a second embodiment of the present invention. Referring to FIGS. 6 and 7, the flow chart of this part of the invention is illustrated. First, the calling party tries to send the called party a SMS message, where the called party is a subscriber to PLMN (step 700). The mobile terminated SMS message is sent to the Service Center 620, which then forwards the message to the SMS Gateway Mobile Switching Center (SMS-GMSC) 650. Thereafter, the SMS-GMSC 650 interrogates the HLR 660 for routing information pertaining to the designated MS 600 (step 710).

The next step is different from the current GSM network. The HLR checks the value of MSSMS (step 720). By default, the value of MSSMS is set to YES. If MSSMS=YES (step 730), this means that the called party does not desire silence or is not in a silence-desired area. Therefore, the MS for the called party is turned ON and is listening to page to receive a SMS message. The HLR then sends routing information to the SMS-GMSC 650, which can then route the message to the MSC/VLR 670 serving the Location Area (LA) (6 in FIG. 1) that the MS 600 is in, and completes the call setup. In the case where MSSMS=NO (step 730), subsequent SMS messages (not including voice mail received page, Caller ID page, callback number page or any other notification of missed voice calls covered by XPAGEID) will result in issuance of a Preventive Disturbance Message (PDM) (step 740). The PDM could be a SMS text message, sent back to the originator of the SMS message, saying, for example, "The subscriber you are trying to send a message to is in an area where it prefers not to be disturbed".

Furthermore, the invention would leave the choice whether to disturb the called party in the hands of the calling party by providing an option to pass the message to the called party if the message is important or emergency (step 740). The connection option could, for example, be "If this message is important or emergency, for instant delivery, press 1; to leave the message for later view, press 2; to delete the message, press 3". Of course, any other numbers, pound, asterisk (*), combination of numbers, combination of numbers and non-number keys, and other voice options like "connect" could be used to pass, store or delete the originating subscriber's message to the called party.

If the originating subscriber decides to disturb the called party (Step 750) by choosing the disturb option from the connection option message, for example, by pressing 1 or saying 'emergency', the HLR will then send routing information to SMS-GMSC and complete call setup (step 735). If the originator of the SMS message decides the message is not important or urgent (step 760), depending on the originator's choice (for example, by pressing 2 for latter view of the message), then the message would be stored at the SMS Service Center (step 765) for future delivery once the called party is out of the silence-desired area. If the originator of the SMS message decides against leaving a message for the called party (for example, by pressing 3), then the message would not be stored at the SMS Service Center or deleted from the buffer or external storage source at the SMS Service Center (step 770).

Figure 3:
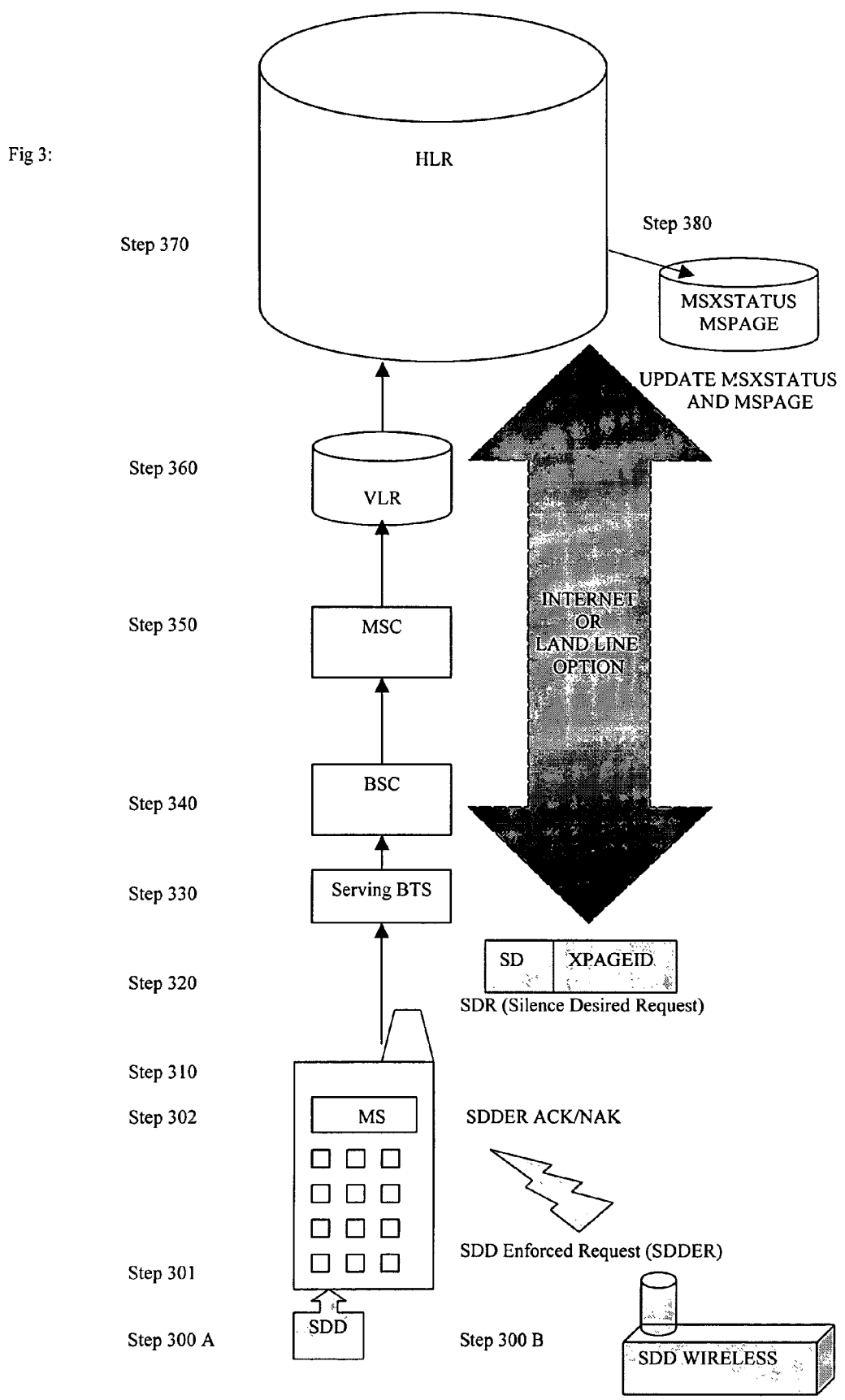
FIG. 3 is a block diagram of a portion of the inventive communication system.

This invention provides an option to the called party's MS to send a Silence Desired Request (SDR) to the MSC. In FIG. 3, the MS of the called party (step 310) transmits a SDR (step 320) to the Serving BTS (step 330), which then sends the request to the serving BSC (step 340). The BSC then sends the request to the MSC (step 350), in turn to the VLR (step 360), and finally to the HLR (step 370). The SDR will contain three subparameters: SD, XPAGEID and XSMS. The SD subparameter indicates whether silence is desired by the MS and would have either the value YES or the value NO. The Silence Page ID (XPAGEID) subparameter indicates whether the MS desires to receive Caller ID page, voice mail received page, or callback number page of non-urgent calls. The XPAGEID subparameter could have either the value of YES or the value of NO. The Silence SMS (XSMS) subparameter indicates whether the MS desires to receive other SMS based messages, such as text based SMS messages. The XSMS subparameter could have either the value of YES or the value of NO. Based on the three components of the SDR (i.e., SD, XPAGEID and XSMS), the HLR then updates the values of its MSXSTATUS, MSPAGE and MSSMS parameters accordingly (step 380).

Those skilled in the art will understand that the called party's choice, Silence Desired Request (SDR), can be activated in a number of different ways. For example, the MS might have a special button or switch, which is used to transmit signal(s) to inform the MSC of its desire. Another alternative is that the SDR signal might be implemented as a called party feature, where a called party presses predetermined keys on the MS. Yet another alternative is a unit that is physically separate from the portable communication device, which has a wireless link to the mobile phone such as Bluetooth, 802.11a or RF devices (step 300B). A further alternative might be a unit that is physically separate from the portable communication device and has a physical link, for example, a serial cable link or power adapter connected to the portable communication device (step 300A). In any case, the SDR is transmitted to the MS, for example, by means of an Unstructured Supplementary Service Data (USSD), a Short Message System (SMS), or a Multimedia Messaging System (MMS). The SDR is received by the BTS and forwarded to the MSC, which is then forwarded to the VLR and the HLR, accordingly.

In the future, mobile networks, such as 3G, the MS will be able to send a signal to the HLR to use an Internet line (See FIG. 3), using technologies such as Voice over IP (VoIP), as a means of generating and receiving calls and messages by the MS. The storage of the SDR parameters (Step 380) such as MSXSTATUS, MSPAGE and MSSMS would allow the HLR to activate PDA for an incoming call regardless of whether the incoming call is connected to the MS using the mobile network or the Internet line. The disclosed method and apparatus can be altered such that the SDR could be sent to the HLR (Step 320) via the Internet or landline using any technology, such as 802.11, VoIP, or a combination of both technologies. Regardless of how the SDR is sent to the HLR and how the call is connected from the HLR to the MS, once the HLR receives the SDR, the HLR will update the SDR parameters (Step 380) such as MSXSTATUS, MSPAGE AND MSSMS to be used for future incoming calls providing call disturbance avoidance and urgent call facilitation based on caller's decision.

As a second embodiment, a working prototype (WP) was designed to prove the main concept "method and apparatus for avoiding call disturbances and facilitating urgent calls based on caller's decision" by using the existing features of the GSM mobile network.

The working prototype (WP) is based on using a Sony Ericsson T68i handset as the MS, and the AT&T network as a GSM network. The MS is under the influence of either an auxiliary physically linked Silent Desired Device (SDD) (FIG. 3, Step 300A) or a Silent Desired Device Wireless (SDDW) (FIG. 3, Step 300B) using either one of the Bluetooth or 802.11 protocols. It requires the MS to be notified every time of an incoming call by the HLR and a subsequent Silence Desired Request (SDR), such as a mobile busy signal or a hangup signal which is generated each time and sent by the MS to the HLR. Upon receipt of the SDR the HLR activates a greeting similar to the PDA and notifies the caller that the called subscriber is in an area where silence is desired. Some mobile networks, such as AT&T mobile networks, allow for the subscriber to have a main voice mail when the called subscriber does not pick up the phone and a secondary voice mail for a line busy/caller busy voice mail option. By receiving a busy signal or pressing the hangup key, the busy signal voice mail, preprogrammed to be similar to the PDA, is activated. The caller is asked if the call is not urgent, to leave a message, and, if urgent, to leave a callback number. The MS has been programmed, using software written in the C language and using parts of Gnokii software, so that the called subscriber:

1) Is notified of voicemail received and text messages received Page if they choose to activate message received Page notification option on their mobile phone.

2) Can decide not to be disturbed by non-urgent calls, and can turn off non-urgent message notification, such as voicemail notification and text message options, but not the callback number, on mobile, or.

3) If the call is urgent in nature and a callback number was left, this number is forwarded by the HLR to the MS and upon its receipt, the called subscriber is notified and given the option to call back.

The Silent Desired Device (SDD) and Silent Desire Device Wireless (SDDW) prototypes were built to prove the following:

1) That a Silent Desired Request (SDR) could be sent to the HLR,

2) That an HLR can receive a form of the SDR,

3) That an HLR can choose a greeting similar to the PDA upon receipt of the SDR, 4) That the caller could be given the option to disturb or not to disturb the called subscriber based on urgency of the call, 5) That the HLR can store voice mail of non-urgent calls and forward the callback number of urgent calls, and 6) That the mobile subscriber can choose to decline non-urgent page notification when in silent desired area.

Based on these accomplishments using the prototypes, it has been proven that a system could be designed that avoids call disturbance of non-urgent calls and facilitates urgent calls based on caller's decision.

A prototype built by following ideas encapsulated within the patent would have further advantages over the working prototype such as:

1) The SDR (for example, in the form of a USSD), need only be sent once to the HLR and not for each individual call, resulting in fewer network signals to be processed back and forth with the MS and the HLR, 2) The MS is in a condition to receive incoming calls and does not need to be programmed to disable incoming calls or send a busy signal, and 3) The HLR, rather than forwarding a callback number to be dialed back by the called subscriber, would decide which calls to connect to the MS and which not to, based on the caller's decision.

Some networks, such as the AT&T mobile network, do currently have the option to avoid message notification such as caller ID, callback number, voice mail and text message notification pages. By tying this option to the PDA, the HLR would decide to not forward non-urgent messages, such as voice mail page and SMS non-urgent text messages to the called subscriber, resulting in no need to program each individual MS.

Referring to FIG. 3, the MS could be under the control of a Silence Desired Device (SDD) with a physical link (Step 300 A). The SDD is actually a program, written in C language using Code Vision AVR software, and embedded in an Atmel chip ATMEGA128-16AC. The Atmel chip is physically linked to the MS by using a serial cable. Referring to FIG. 9, once the MS is under the control of the Silent Desired Device, the called subscriber is informed that they are in a silent desired area (Step 900). The called subscriber could then decide (Step 910) to use the silent desired program or not. If the called subscriber does not wish to use the silent desired program, calls to the MS will take place as normal without the PDA activation (Step 915). Otherwise the mobile is first reset to factory configuration (Step 918) and then the silent desired profile is set on the MS (Step 920). The Silent Desired (XP) program makes use of the AT commands embedded by the manufacturer in the mobile handheld for the purpose of providing a built-in modem for the mobile phone. Each mobile phone is equipped with a number of different profiles, such as Normal, Headset, and Bluetooth. A mobile user is able to add or modify profiles at will. For instance, in a car, the mobile phone can disconnect an incoming call to avoid the phone from picking up, or can set the mobile phone to silent. The SDD is able to dictate the profile in use by the mobile phone by sending a command such as active profile set, AT*EAPS (Step 920).

Figure 8:
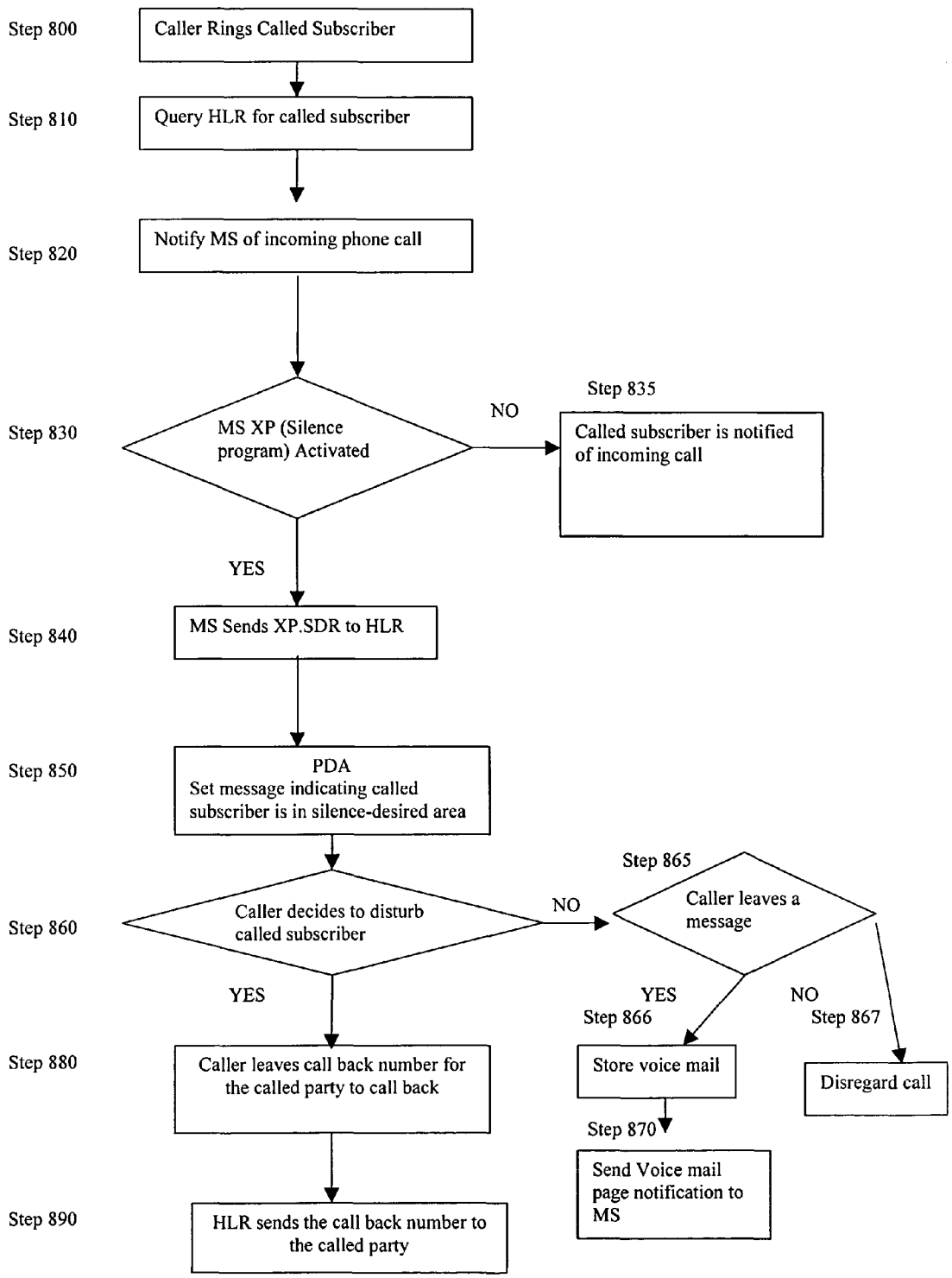
FIG. 8 is a flow chart of the steps performed by the HLR when used in a working prototype for the patent application.

Referring to FIGS. 8 and 9, once an incoming call notification is received by the MS (Step 820, 940), if the MS silence program (XP) is not activated, the called subscriber is notified of an incoming call (Step 835). On the other hand, if the MS silence program (XP) is activated, the MS sends a Silent Desired Request to the HLR (Step 840, 960). The MS generates a SDR by either using a "disable incoming call option" set manually in the mobile profile (Step 950) or by pressing the hangup key (the Red Key) using (AT+CKPD) (Step 955). Once the HLR receives the XP.SDR the Preventive Disturbance message is activated (Step 850) notifying the caller that the called subscriber is in a silence desired area. Some networks allow the subscribers to have a main voice mail when the caller does not pick up the phone, or a secondary busy signal voice mail/caller busy voice mail. Upon pressing the hangup key the busy voice mail is activated. As such, the PDA replaces the busy voice mail and is activated to say "The called subscriber is in an environment where silence is desired. If this is an emergency please leave a callback number by pressing 5, otherwise leave the subscriber a voice mail". Even though the use of busy voice mail might lead to a misleading announcement such as when the called subscriber is actually talking on the incoming mobile line, the purpose of using the busy voice mail is to demonstrate it is possible to choose between the main voice mail and the busy voice mail once the HLR receives a silence desired request. The working prototype (WP) would even work on networks which do not support busy voice mail.

If the caller decides the call is urgent and leaves a callback number for the called party (Step 880), the HLR then sends a callback number page to the called party (Step 890). The MS under the influence of SDD could be programmed to inform the called party of incoming new messages by using AT+CMTI (Step 970). Once the SDD decides it has received a callback number it would store the callback number and inform the called subscriber of an urgent call to be made (Step 980). The called subscriber would then be able to choose, based on his/her circumstances, to call the urgent call number or not.

If the caller decides not to disturb the called subscriber (Step 860), the caller could either leave a voice mail (Step 865) to be stored by the HLR (Step 866) or the caller can hangup in which case the call is disregarded (Step 867). If the caller leaves a voice mail the HLR sends a voice mail received notification to the MS (Step 870). The MS, under the influence of SDD, could take care of incoming message notifications by using the MS silent page program (i.e., XP.PAGE) (Step 990). The XP.PAGE program dictates that voice mail notification messages and text messages (but not callback number messages) would either be shown (Step 995) or not (Step 997). This is done, for example, by asking the mobile subscriber for a certain combination of keys (for example, *10=message notification off, or *11=message notification ON) when the XP program is running. This could be accomplished by using an AT+CMER (mobile equipment event reporting), which causes AT+CKEV (press mobile phone key) notification message to be sent from the phone when the subscriber presses appropriate keys. These commands would order the MS to notify the Silent Desired (XP) program of key presses. If the called subscriber chooses message notification OFF the MS XP.PAGE would not show the voice mail and other non-urgent Pages (Step 997) until the XP is turned off. If the called subscriber chooses the message notification "ON", the MS XP would show voice mail Page and other non-urgent Pages (Step 995).

In most situations a wireless version of the Silent Desired Device (SDD) is required. For example, the driver of a car or patrons of a restaurant or theatre would all appreciate the functionality of the Silent Desired (XP) program delivered wirelessly. Currently, working prototypes (WPs) using Bluetooth and 802.11b technologies have been developed.

The Wireless Silent Desired (XPW) program searches for mobile phone and then connects to a phone if it matches the access criteria. The access criteria required for XPW to make a connection depends on which access mode it is running in.

In OPEN mode XPW will connect to all found phones that are not present in the "denied" list specified by the operator. For example, this mode would be used for public access points. In RESTRICTED mode, XPW will connect only to those phones that are in an "allowed" list specified by the operator or subscriber. For example, this mode could be used in a vehicle by the driver.

Once the wireless connection is made, XPW will run the standard XP program to control the mobile handheld, by forwarding the AT commands and responses over the wireless link instead of a serial connection. Therefore, XPW searches for the wireless phones, manages which phones should be connected to, and then runs the XP program on each connected mobile phone.

When a user quits their instance of the XP program, XPW will only try to reconnect once the user has left the area (i.e., failed to be found in a search). This way the user is not prompted to allow the XPW program right after having quit it.

Currently, the high-level XPW program runs on two platforms:

Linux PC. This is the basis for the working prototype (WP), and could be the hardware used for a public access point. With Linux, the XPW program can control multiple Bluetooth and 802.11 mobile phones at the same time. This platform can make use of scanning functions so that it can discover new phones and connect if they meet the access criteria.

Embedded Processor. This portable platform could be utilized in a wireless environment such as a vehicle-based XPW program. An embedded processor typically does not need any scanning functions; it could run in the RESTRICTED access mode, and simply attempt to connect to the phones allowed by the user's configuration. This results in an embedded device realistically only needing to control a single mobile phone via either 802.11 or Bluetooth in a XPW environment. Optionally, scanning functions can be included and a real time operating system would allow for multiple phones to be controlled simultaneously.

The specifics of the Bluetooth and 802.11 wireless links are discussed below.

Bluetooth Specifics

For Bluetooth, XPW uses the Bluetooth hardware addresses (e.g. 00:80:37:D5:E3:3 D) to identify the mobile phones, due to the fact that these hardware addresses are unique. Therefore, the allowed and denied access lists are populated with Bluetooth hardware addresses. The Bluetooth WP scans for all reachable and discoverable Bluetooth phones and, if they match the access criteria required for the access mode (discussed above), an RFCOMM connection will be made. The RFCOMM connection creates a virtual serial link and allows the XP program to run as if the phone was connected with a serial cable. This allows the XPW program to spawn an instance of the XP program to manage each individual mobile phone and the subscriber would see no difference between the wireless and wired program.

When the RFCOMM connection is made, the user is presented with a prompt on the phone that asks them to authorize the connection. This prompt shows the name of the device attempting to connect, so a unique name that signifies the XPW program is used. If the user authorizes the connection, the user must then enter a password (or PIN) correctly for the connection to be established. For the WP, this connection prompt signifies Step 900 and the user's response of either accepting or denying the connection is Step 910.

802.11 Specifics

For 802.11, the WP uses the mobile phone's Internet Protocol (IP) address (e.g. 192.168.2.154) as an identifier. Currently the WP will only work in the RESTRICTED access mode, because 802.11b hardware does not support scanning for reachable mobile phones. On the other hand, many devices do support 802.11b scanning, which allows detection of any devices within range, even if they are on different networks and it would be clear to those skilled in the relevant arts to do so. Different 802.11b networks are denoted via ESSID identifiers, and a device can only communicate with other devices inside its ESSID. Therefore, for the WP, the mobile phone must be on the same ESSID and have the same security and encryption settings as the SDDW's 802.11b hardware. Without scanning functionality, the WP does a simple ping test to determine which allowed devices are reachable and if a mobile phone answers the pings, XPW will connect and run the XP program.

XPW connects by launching a forwarding program that sends and receives TCP/IP messages to the mobile phone over the 802.11b link. This forwarding program uses a Linux pseudo terminal to allow the standard XP program to open a virtual serial port and then send and receive AT commands over the wireless link. This allows the XP program to be used wirelessly with no modifications. In addition, as there are no 802.11 mobile phones currently available in the market, the WP employed an additional piece of hardware that forwards the 802.11b messages to the mobile phone via Bluetooth or serial link.

FIG. 4 is a flow chart of the operation of a portion of the inventive mobile communication system. Referring to FIG. 4, if a party (for example, a called party) desires silence, it will send an SDR request to the HLR (step 400). Once the HLR receives the SDR, the HLR will update its database according to value of the SDR parameters. If SDR.SD=YES (step 410), the HLR sets the parameter MSXSTATUS=YES (step 420) and checks the value of SDR.XPAGEID (step 421). If SDR.XPAGEID=YES, the HLR sets MSPAGE=NO (step 422) and does not page the called party concerning non-urgent received calls, Caller ID and/or voice mail and/or a callback number. If SDR.XPAGEID=NO, the HLR sets MSPAGE=YES (step 423), and pages the called party concerning received Caller ID and/or voice mail and/or callback numbers of urgent and non-urgent calls. At any time, while the silence-desired option is activated at the HLR, the called party can inactivate the silence-desired option and messages by sending a SDR.SD=NO to the HLR (step 410).

When the HLR receives a SDR.SD=NO, it will change MSXSTATUS to NO (step 430). If MSPAGE=YES (step 440) (i.e., the HLR had paged the calling party for Caller ID, voice mail and callback numbers of urgent and non-urgent calls), the HLR would not need to page the called party any more (step 450). If MSPAGE=NO (step 440), the HLR will change MSPAGE to YES (step 460), and will check to see if the called party had received any non-urgent calls (step 470).

If there were any non-urgent calls, the HLR, with the help of the SMS/SC, would page the called party concerning received Caller IDs and/or voice mail and/or callback numbers (step 480). If no non-urgent calls were received while Silence Desired request was ON, the HLR would not page the called party (step 490) for received Caller IDs and/or voice mail and/or callback numbers of non-urgent calls.

Further referring to FIG. 4, if SDR.SD=YES (step 410), the HLR sets the parameter MSXSTATUS=YES (step 420) and checks the value of SDR.XSMS (step 424). If SDR.XSMS=YES, the HLR sets MSSMS=NO (step 425) and will not page the called party of non-urgent received SMS messages. If SDR.XSMS=NO (step 424), the HLR sets MSSMS=YES (step 426), and will page the called party concerning received SMS messages. At any time, while the silence-desired option is activated at the HLR, the called party can inactivate the silence-desired option and messages by sending a SDR.SD=NO (step 410) to the HLR. When the HLR receives a SDR.SD=NO it will change MSXSTATUS to NO (step 430). If MSSMS=YES (step 431) (i.e., the HLR had paged the calling party for received SMS messages), the HLR would not need to page the called party any more (step 432). If MSSMS=NO (step 431), the HLR will change MSSMS to YES (step 433), and will check to see if the called party had received any non-urgent messages (step 434). If there were any non-urgent SMS messages, the HLR, with the help of SMS/SC, would page the called party concerning received non-urgent SMS messages (step 435). If no non-urgent SMS messages were received while Silence Desired request was ON, the HLR would not page the called party (step 436) concerning received SMS messages of non-urgent calls.

Figure 5:
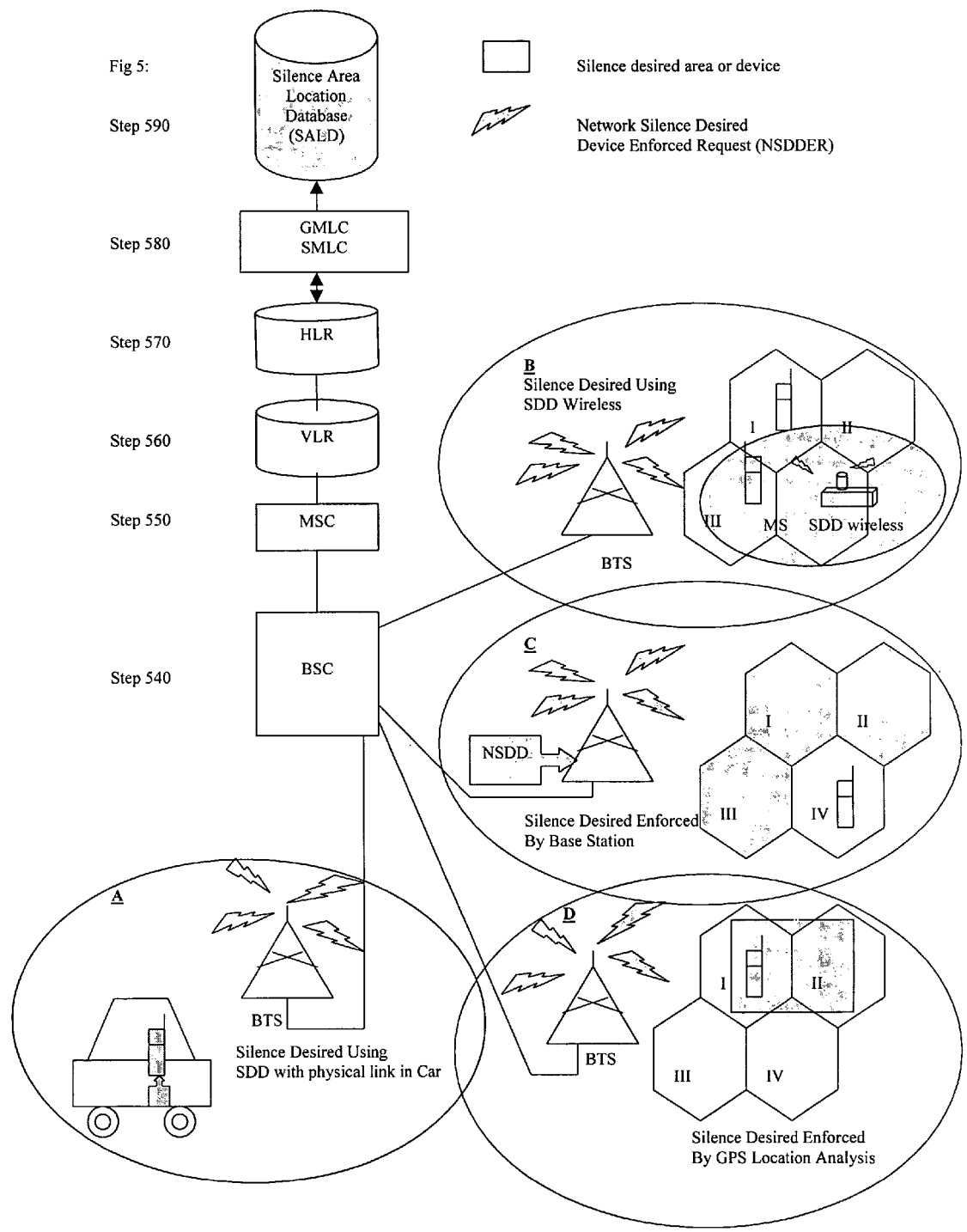
FIG. 5 is a block diagram of a preferred embodiment of the present invention.

Referring to FIGS. 3 and 5, another embodiment of the present invention provides an external silence-desiring device (SDD) for use with the portable communication device. The external SDD would dictate the mobile station to send a silence-desired request (SDR) message (FIG. 3, step 320) to the BTS (FIG. 3, step 330), which further transfers it to the BSC, MSC, VLR and the HLR.

The SDD could either be physically attached to the portable communication device (FIG. 3, step 300A and FIG. 5, Section A) or having a wireless link, such as Bluetooth, WLAN, RF, and 802.11b devices, (FIG. 3, step 300B and FIG. 5, Section B) with the portable communication device. The SDD will send a SDD Enforced Request (SDDER) message (FIG. 3, step 301) to the MS. The called party associated with the MS can preprogram the MS to respond immediately to the SDDER message, either accepting or rejecting the SDDER message with a SDDER ACK/NAK message (FIG. 3, step 302). The called party can also manually accept or reject the SDDER message (for example, by pushing buttons, switches or voice command), once it is displayed on the portable communication device. Once the MS replies with SDDER ACK/NAK message, the MS can be programmed to avoid further influence from the originating SDD while the SDD is physically attached to the MS (FIG. 5, Section A) or in the coverage area of the wireless SDD (FIG. 5, Section B).

Another embodiment of the present invention is to provide a Network Silence Desired Device (NSDD). Referring to FIG. 5, the NSDD can be a modified BTS (FIG. 5, Section C) that enforces silence once a portable communication device is in a silence-desired enforced cell (FIG. 5, Section C, Cells I, II and III) being covered by the BTS. The NSDD could also be based on GPS (FIG. 5, Section D), which enforces silence-desired based on the location of the portable communication device being compared by HLR (FIG. 5, step 570) in contact with the Gateway Mobile Location Center (GMLC) and/or the Serving Mobile Location Center (SMLC) (FIG. 5, step 580) to a database of silence-desired locations (FIG. 5, step 590). The BTS, under the influence of NSDD (FIG. 5, Section C and D), transmits a Network Silence Desired Device Enforced (NSDDER) message to the portable communication device MS. This can be achieved, for example, by a NSDDER message sent over a broadcast channel to force the MS to send the HLR a Silence Desired Request (SDR) (FIG. 3, step 320). Alternatively, the called party associated with a portable MS can preprogram the MS to respond immediately to the NSDDER message with either an accept or a reject the SDR message. The called party can also manually (for example, by pushing a button, a switch or voice activated functions) accept or reject the NSDDER message once displayed on the MS screen.

At any time, while the Preventive Disturbance Announcement (PDA) is activated at the HLR, the called party can inactivate the silence-desired option and messages by sending a SDR.SD=NO (FIG. 4, step 410) to the HLR. This can be done, for example, by pressing a button or switch on the MS, by issuing voice commands, or by disconnecting the physical link between the SDD and the MS (FIG. 5, Section A). The MS could also send SDR.SD=NO once the MS is no longer under the control of the external silence-desired device (FIG. 5, Section B, Cell I, the MS outside the gray silence-desired ellipse).

In another alternative preferred embodiment of the current invention, the NSDD can be programmed by network administrator(s) to activate a Preventive Disturbance Announcement (PDA) without the approval of the called mobile called party. This can be done in two ways. In the first way, the NSDD (FIG. 5, Section C) could be programmed by network administrator(s) to send an automatic SDR from the BTS to the HLR. The network administrator(s) can establish the default response to be a SDR.SD=YES, SDR.XPAGEID=YES or NO and SDR.XSMS=YES or NO, once the mobile terminal is within a silence-desired area (FIG. 5, Section C, Cells I, II, III). In the second way, if a GPS is used (FIG. 5, Section D), the network administrator(s) can have the HLR set default MSXSTATUS=YES, MSPAGE=YES or NO and MSSMS=YES or NO once the MS coordinates are compared by the HLR to the Silence Area Location Data Base and it is determined that the MS is within a silence-desired area (FIG. 5, Section D, grey triangle). The second alternative does not require the SDR to be sent to the HLR.

At any time that the Preventive Disturbance Announcement (PDA) is activated at the HLR, the NSDD can inactivate the PDA in two different ways. In the first way, the NSDD (FIG. 5, Section C) can be programmed by network administrator(s) to send an automatic SDR.SD=NO, from the BTS to the HLR, once the mobile station is no longer in a coverage area of a silence-desired enforced cell (FIG. 5, Section C, Cell IV). In the second way, if a GPS is used (FIG. 5, Section D), the network administrator(s) could have the HLR set to default MSXSTATUS=NO, MSPAGE=YES and MSSMS=YES once the MS coordinates are compared with the silence-desired data base, and the MS is determined to be outside the silence-desired area (FIG. 5, section D, outside the Gray Triangle in cells I, II, III and IV).

The concepts in this description with respect to SMS messaging could be applied to other types of messaging, such as Multimedia Messaging Service (MMS) or Enhanced Messaging Service (EMS) messaging. EMS standard allows pictures, sounds, animations and formatted text to be swapped between compliant mobile phones. The Multimedia Messaging Service (MMS) is the ability to send messages comprising a combination of text, sounds, images and video to MMS capable handsets.

The previous description of the preferred embodiments is provided to enable any person skilled in the art to make or use the present invention. The various modifications to these embodiments will be readily apparent to those skilled in the art, and the generic principles defined herein may be applied other embodiments without the use of the inventive faculty. Thus, the present invention is not intended to be limited to the embodiments shown herein but is to be accorded the widest scope consistent with the principles and novel features disclosed herein.

While the foregoing is a detailed description of the preferred embodiment of the invention, there are many alternative embodiments of the invention that would occur to those skilled in the art and which are within the scope of the present invention. Accordingly, the present invention is to be determined by the following claims.

The invention claimed is:

1. An apparatus for controlling access to at least one subscriber in a communication system, the subscriber being in either an access-denied state or an access-allowed state, comprising:

a memory to store a single parameter, the single parameter having two states, a first state indicating the access-allowed state and a second state indicating the access-denied state;

a receipt circuit to receive a message from a calling party directed to the subscriber;

a state evaluation circuit to determine whether the subscriber is in the access-denied state or the access-allowed state according to the two states of the single parameter;

a message handling circuit to forward the received message to the subscriber when the subscriber is in the access-allowed state, according to the two states of the single parameter; and a transmit circuit to send a reply message to the calling party indicating that the subscriber is in the access-denied state and to provide an override option to the calling party, wherein the message handling circuit is configured to forward the received message to the subscriber when the calling party selects the override option and the subscriber is in the access-allowed state, and wherein the message handling circuit is configured to store the received message until the subscriber is in the access-allowed state when the subscriber is in the access-denied state and the calling party does not select the override option.

2. The apparatus of claim 1, wherein the message handling circuit forwards a notification message to the subscriber when the subscriber is in the access-allowed state.

3. The apparatus of claim 2, wherein the message handling circuit is adapted to receive a response message from the subscriber, permitting one of at least two possible responses to the notification message.

4. The apparatus of claim 3, wherein one of the possible responses is to allow the received message to be forwarded to the subscriber.

5. The apparatus of claim 4, wherein the received message has a priority state and the received message is forwarded to the subscriber only if the priority state is allowed in the response message from the subscriber.

6. The apparatus of claim 1, wherein the circuits are one or more appropriately programmed computers.

7. A method for controlling access to at least one subscriber in a communication system, the subscriber being in either an access-denied state or an access-allowed state, the method comprising the steps of:

storing a single parameter by the subscriber, the single parameter having two states, a first state indicating the access-allowed state and a second state indicating the access-denied state;

receiving a message from a calling party directed to the subscriber;

determining whether the subscriber is in the access-denied state or the access-allowed state according to the two states of the single parameter;

forwarding the received message to the subscriber when the subscriber is in the access-allowed state, according to the two states of the single parameter;

sending a reply message to the calling party indicating that the subscriber is in the access-denied state and providing an override option to the calling party;

forwarding the received message to the subscriber when the calling party selects the override option and the subscriber is in the access-allowed state; and storing the received message until the subscriber is in the access-allowed state when the subscriber is in the access-denied state and the calling party does not select the override option, according to the two states of the single parameter.

8. The method of claim 7, wherein the forwarding step includes forwarding a text message to the subscriber when the subscriber is in the access-allowed state.

9. The method of claim 8, wherein the forwarding step includes receiving a response message from the subscriber, permitting one of at least two possible responses to the notification message.

10. The method of claim 9, wherein one of the possible responses is to allow the received message to be forwarded to the subscriber.

11. The method of claim 10, wherein the received message has a priority state and the received message is forwarded to the subscriber only if the priority state is allowed in the response message from the subscriber.

12. The method of claim 7, wherein the single parameter is independent of a time period.

13. An apparatus for controlling access to at least one subscriber in a communication system, the subscriber being in either an access-denied state or an access-allowed state, the apparatus comprising:

means for storing a single parameter by the subscriber, the single parameter having two states, a first state indicating the access-allowed state and a second state indicating the access-denied state;

means for receiving a message from a calling party directed to the subscriber;

means for determining whether the subscriber is in the access-denied state or the access-allowed state according to the two states of the single parameter;

means for forwarding the received message to the subscriber when the subscriber is in the access-allowed state, according to the two states of the single parameter; and means for sending a reply message to the calling party indicating that the subscriber is in the access-denied state and to provide an override option to the calling party, wherein the means for forwarding forwards the received message to the subscriber when the calling party selects the override option and the subscriber is in the access-allowed state, and stores the received message until the subscriber is in the access-allowed state when the subscriber is in the access-denied state and the calling party does not select the override option.

14. The apparatus of claim 13, wherein the means for storing, or forwarding the received message includes means for forwarding a notification message to the subscriber when the subscriber is in the access-allowed state.

15. The apparatus of claim 14, wherein the means for storing, or forwarding the received message includes means for receiving a response message from the subscriber, permitting one of at least two possible responses to the notification message.

16. The apparatus of claim 15, wherein one of the possible responses is to allow the received message to be forwarded to the subscriber.

17. The apparatus of claim 16, wherein the received message has a priority state and the received message is forwarded to the subscriber only if the priority state is allowed in the response message from the subscriber.

18. The apparatus of claim 13, wherein the single parameter is independent of a time period.

19. An apparatus for signaling a network being used by a mobile system in a communication system, the mobile system being in either an access-denied state or an access-allowed state, comprising:

a first circuit to cause the mobile system or part of the network to send a message directed to the network, the message including a single parameter, the single parameter having two states, a first state indicating the access-allowed state and a second state indicating the access-denied state;

a receipt circuit to receive the message directed to the network;

a state evaluation circuit to determine whether the mobile system is in the access-denied or the access-allowed state according to the two states of the single parameter;

a message handling circuit to forward the message to the network when the mobile system is in the access-allowed state according to the two states of the single parameter; and a transmit circuit to send a reply message to the calling party indicating that the subscriber is in the access-denied state and to provide an override option to the calling party, wherein the message handling circuit is configured to forward the received message to the subscriber when the calling party selects the override option and the subscriber is in the access-allowed state, and wherein the message handling circuit is configured to store the received message until the subscriber is in the access-allowed state when the subscriber is in the access-denied state and the calling party does not select the override option.

20. The apparatus of claim 19, wherein the mobile system is physically linked to the first circuit.

21. The apparatus of claim 19, wherein the mobile system is wirelessly linked to the first circuit.

22. The apparatus of claim 19, wherein the network comprises hardware and software, and the first circuit is embedded within the hardware and software of the network.

23. The apparatus of claim 19, wherein the first circuit causes the mobile system or part of the network to send the message as a function of the location of the mobile system.

24. The apparatus of claim 23, wherein the location of the mobile system is determined by the Global Positioning System.

25. A method for signaling a network being used by a mobile system in a communication system, the mobile system being in either an access-denied state or an access-allowed state, comprising the steps of:

a) causing the mobile system or part of the network to send a message directed to the network, the message including a single parameter, the single parameter having two states, a first state indicating the access-allowed state and a second state indicating the access-denied state;

b) receiving the message directed to the network;

c) determining whether the mobile system is in the access-denied or the access-allowed state according to the two states of the single parameter; and d) forwarding the message to the network when the mobile system is in the access-allowed state;

e) sending a reply message to the calling party indicating that the subscriber is in the access-denied state and providing an override option to the calling party;

f) forwarding the received message to the subscriber when the calling party selects the override option and the subscriber is in the access-allowed state; and g) storing the message directed to the network until the subscriber is in the access-allowed state when the subscriber is in the access-denied state and the calling party does not select the override option, according to the two states of the single parameter.

26. The method of claim 25, wherein step a) includes physically linking the mobile system and the network.

27. The method of claim 25, wherein step a) includes wirelessly linking the mobile system and the network.

28. The method of claim 25, wherein the network comprises hardware and software, and step a) is performed by hardware and software embedded within the network.

29. The method of claim 25, wherein step a) includes causing the mobile system or part of the network to send the message as a function of the location of the mobile system.

30. The method of claim 29, wherein step a) includes locating the mobile system by using the Global Positioning System.

31. An apparatus for signaling a network being used by a mobile system in a communication system, the mobile system being in either an access-denied state or an access-allowed state, comprising:

means for causing the mobile system or part of the network to send a message directed to the network, the message including a single parameter, the single parameter having two states, a first state indicating the access-allowed state and a second state indicating the access-denied state;

means for receiving the message directed to the network;

means for determining whether the mobile system is in the access-denied or the access-allowed state according to the two states of the single parameter;

means for forwarding the message to the network when the mobile system is in the access-allowed state, according to the two states of the single parameter; and means for sending a reply message to the calling party indicating that the subscriber is in the access-denied state and to provide an override option to the calling party, wherein the means for forwarding forwards the received message to the subscriber when the calling party selects the override option and the subscriber is in the access-allowed state, and stores the received message until the subscriber is in the access-allowed state when the subscriber is in the access-denied state and the calling party does not select the override option.

32. The apparatus of claim 31, wherein the mobile system is physically linked to the means for causing the mobile system or part of the network to send a message.

33. The apparatus of claim 31, wherein the mobile system is wirelessly linked to the means for causing the mobile system or part of the network to send a message.

34. The apparatus of claim 31, wherein the network comprises hardware and software, and the means for causing the mobile system or part of the network to send a message is embedded within the hardware and software of the network.

35. The apparatus of claim 31, wherein the means for causing the mobile system or part of the network to send a message causes the mobile system or part of the network to send the message as a function of the location of the mobile system.

36. The apparatus of claim 35, wherein the location of the mobile system is determined by the Global Positioning System.

* * * * *